B. & V. Calkins,
Portable Fence,
No. 63,362. Patented Apr. 2, 1867.
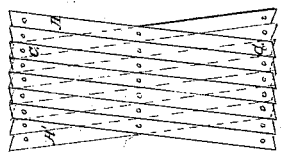
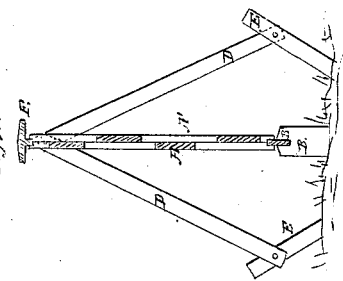
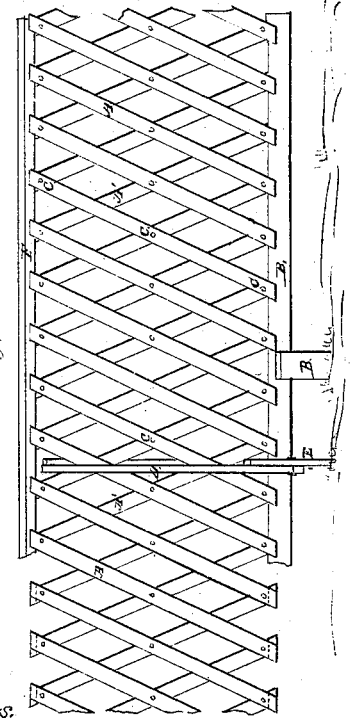
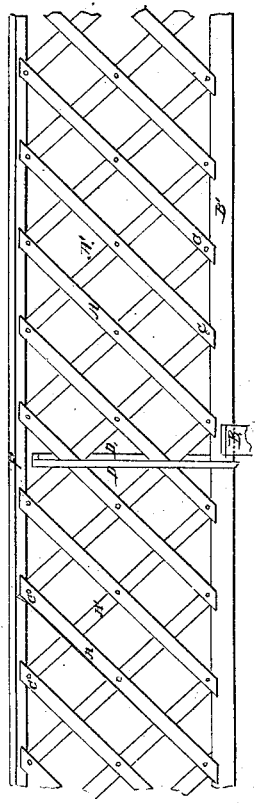
Witnesses:
Inventors:

United States Patent Office.

BELUS CALKINS AND VERANOUS CALKINS, OF VARYSBURG, NEW YORK.

*Letters Patent No. 63,362, dated April 2, 1867.*

IMPROVEMENT IN PORTABE FENCE.

*The Schedule referred to in these Letters Patent and making part of the same.*

TO ALL WHOM IT MAY CONCERN:

Be it known that we, BELUS CALKINS and VERANOUS CALKINS, of Varysburg, Wyoming county, and State of New York, have invented a certain new and improved Portable Fence; and we do hereby declare that the following is a full and exact description thereof, reference being had to the accompanying drawings, making a part of this specification, in which—

Figure I is a side elevation of a portion of our improved fence.

Figure II is a transverse vertical section.

Figure III represents the same when folded up for transportation.

Figure IV is a side elevation of the same when extended and used as a low fence or hedge.

The nature of this invention consists, first, in the construction and combination of a number of flat bars, placed crosswise an equal number of other bars, and each fastened at three points of intersection, in such manner that the whole may be either folded up in a compact form, convenient for transportation, or spread out to any desired length, (the height decreasing as the length increases,) and set up and fastened to the ground in any convenient manner, so as to form a diamond-shaped lattice fence; second, in the construction, application, and use of a supporting fence brace, combined of two bars or levers hinged together at the top, and straddling transversely over the top of the fence, the lower end of each lever being hinged to a stake, which is driven into the ground at an angle to the lever of about thirty degrees, more or less, or in such manner that the strain upon the stake will be at an angle sufficient to prevent its being drawn out; third, in the combination and arrangement of a number of short stakes, driven permanently into the ground, and a top connecting-bar, with a folding lattice fence, and transversely supporting brace bars or levers, in a manner to form a strong, cheap, and durable portable fence.

Letters of like name and kind refer to like parts in each of the figures.

A A' represents a number of bars or slats of wood one-half of which, A, is placed crosswise upon the other half, A', each half running parallel. Both are connected by means of bolts, clinch nails, or in any other convenient and sufficiently durable manner, at the points where the bars cross each other, as shown at C. This constitutes the main part of our improved fence, which is built in sections, and each section may be folded up, as represented in Fig. III, and loaded upon a wagon and transported from one field or place to another. It has one great advantage over other portable fences, which consists in that it may be easily and readily changed from a high to a low fence for use either as a barn-yard fence or a low garden hedge, as may be desired; and that it need not be divided, when taken apart, into a great number of pieces, which it requires a great deal of time and labor to put together. Each section may be used as a high or low fence by folding it up closer or stretching it out farther, and the height decreases in proportion as the length thereof is increased, so that it requires a greater number of sections to build a high fence of a certain length than to erect a low one. B B represent a number of short posts or stakes, driven permanently into the ground, projecting only a few inches above the surface. These posts form a foundation upon which the fence is erected, and secured as follows: B' represent bars or planks placed edgewise within a slot cut in the posts B, forming a continuous line and connecting the posts together. A section of the fence is then unfolded and placed upon the said planks. The lower ends of the bars or slats composing the fence are either grooved or one may be made shorter than its opposite neighbor, or they may be arranged in any other convenient manner, so that the fence will rest firmly upon the said horizontal plank B.' The next thing to be done is to brace the fence laterally. This we accomplish by means of the hinged brace-levers D D and stakes E E, Fig. II. The bars or arms D are hinged together and placed one upon each side of the fence, the joint straddling transversely over the top thereof. The other end of each brace-bar is hinged to the short stake E, which is driven into the ground several feet distant from the line of the fence at such relative position to the brace-arms and fence that the strain upon the stake will be sidewise or at an angle thereto, and hence renders it almost impossible to lift the stake out of the ground. Both stakes upon either side of the fence are driven into the ground sufficiently to bring the levers D to bear heavily and firmly upon the top of the fence, and thereby prevent any lateral movement thereof. A bar, F, may be laid on the top of the fence, the upper ends of the bars forming the same being either grooved, notched, or otherwise formed, similar to their lower ends, for the purpose of receiving the bar F, and the latter may have a broad board or plank laid horizontally upon and fastened to the edge thereof, so as to cover the whole and keep the fence in line. The foundation posts or stakes E, as well as the brace-bars D, may be placed at any distance apart to suit the size and heft of the fence; and where great strength and durability are not an object, the top bar F, or the foundation stakes B, or both, may be entirely dispensed with, and yet the fence as a whole be set up and answer its purpose satisfactorily.

What we claim as our invention, and desire to secure by Letters Patent, is—

1. A portable fence made in sections, constructed in the manner and substantially as herein described.

2. The combination and arrangement of the hinged brace-bars D D, and stakes E E, forming a portable brace for fences, constructed and adjusted in the manner substantially as herein set forth.

3. The combination and arrangement of the foundation posts B, folding fence A A', top and bottom connecting-bars F and B', and adjustable braces D E, in the manner and substantially as herein described.

BELUS CALKINS,
VERANOUS CALKINS.

Witnesses:
F. A. LANGWORTHY,
B. H. MUEHLE.